United States Patent
Wakabayashi et al.

(10) Patent No.: US 7,421,720 B2
(45) Date of Patent: Sep. 2, 2008

(54) OPTICAL DISK DEVICE

(75) Inventors: Kanji Wakabayashi, Kyoto (JP);
Masuo Maruyama, Moriguchi (JP);
Yoshito Saji, Ashiya (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 294 days.

(21) Appl. No.: 10/515,106

(22) PCT Filed: Jul. 28, 2003

(86) PCT No.: PCT/JP03/09556

§ 371 (c)(1),
(2), (4) Date: Nov. 19, 2004

(87) PCT Pub. No.: WO2004/034399

PCT Pub. Date: Apr. 22, 2004

(65) Prior Publication Data

US 2006/0072382 A1   Apr. 6, 2006

(30) Foreign Application Priority Data

Oct. 10, 2002   (JP) .............................. 2002-297297

(51) Int. Cl.
*G11B 33/14* (2006.01)
(52) U.S. Cl. ...................... 720/649; 720/648
(58) Field of Classification Search ................ 720/748, 720/749, 648, 649
See application file for complete search history.

(56) References Cited

U.S. PATENT DOCUMENTS

| | | | | |
|---|---|---|---|---|
| 4,771,412 A | * | 9/1988 | Aihara et al. | 720/649 |
| 5,297,116 A | * | 3/1994 | Ikuma | 720/649 |
| 5,335,217 A | * | 8/1994 | Kaneda et al. | 720/648 |
| 5,418,775 A | * | 5/1995 | Okatani | 369/275.5 |
| 5,493,457 A | * | 2/1996 | Kawamura et al. | 720/648 |
| 5,557,595 A | * | 9/1996 | Ishii | 720/649 |

FOREIGN PATENT DOCUMENTS

| | | | | |
|---|---|---|---|---|
| EP | 465153 A1 | * | 1/1992 | |
| JP | 03058373 A | * | 3/1991 | |
| JP | 03102652 A | * | 4/1991 | |
| JP | 04067386 A | * | 3/1992 | |
| JP | 04195793 A | * | 7/1992 | |
| JP | 04195988 A | * | 7/1992 | |

(Continued)

*Primary Examiner*—William J Klimowicz
(74) *Attorney, Agent, or Firm*—Hamre, Schumann, Mueller & Larson, P.C.

(57) ABSTRACT

An optical disk device includes: an optical disk drive mechanism disposed in a housing-shape drive case (2), the optical disk drive mechanism including an optical head (7) on which a semiconductor laser (5) is mounted, a rotary driver for driving an optical disk (8), and a transfer mechanism for transferring the optical head (7); and an agitating fan (12) for making air in the drive case (2) flow. In the optical disk device, a wind path is formed so that the air in the drive case (2) flows in a manner in which it is drawn toward an agitating fan (12) side and the drawn air is discharged toward the optical head (7) or the semiconductor laser (5) by rotation of the agitating fan (12). Therefore, a rise in temperature of the semiconductor laser (5) can be suppressed effectively, while the dust proofing is ensured.

18 Claims, 14 Drawing Sheets

FOREIGN PATENT DOCUMENTS

| | | | | |
|---|---|---|---|---|
| JP | 05325533 A | * | 12/1993 |
| JP | 06236677 A | * | 8/1994 |
| JP | 07169254 A | * | 7/1995 |
| JP | 08007560 A | * | 1/1996 |
| JP | 8-102180 | | 4/1996 |
| JP | 08147740 A | * | 6/1996 |
| JP | 10124917 A | * | 5/1998 |
| JP | 11110959 A | * | 4/1999 |
| JP | 11112177 A | * | 4/1999 |
| JP | 2000090657 A | * | 3/2000 |
| JP | 2000285667 A | * | 10/2000 |
| JP | 2001155478 A | * | 6/2001 |
| JP | 2001319469 A | * | 11/2001 |
| JP | 2001338460 | * | 12/2001 |
| JP | 3085343 | | 2/2002 |
| JP | 2002-184166 | | 6/2002 |
| JP | 2002-184167 | | 6/2002 |
| JP | 2002184167 A | * | 6/2002 |

* cited by examiner

OPTICAL DISK DEVICE

TECHNICAL FIELD

The present invention relates to an optical disk device on which an optical disk drive is mounted.

BACKGROUND ART

Generally, if dust continuously enters an optical disk drive, the dust adheres to an optical system of an optical head, in particular, an objective lens, and an amount of light emitted from the optical head is reduced progressively. When the amount of light is reduced progressively, amplitudes of a recording/reproducing signal as well as a focusing control signal and a tracking control signal for the objective lens deteriorate continuously, and finally the system fails, so that it becomes impossible to perform recording/reproduction. On this account, to ensure the reliability of the optical disk drive, it is necessary to take dust-proofing measures to prevent the entry of dust as much as possible, such as hermetically sealing the optical disk drive.

On the other hand, an optical disk device on which the optical disk drive is mounted is equipped with parts as sources of heat generation, such as a disk motor, an optical head transfer motor, a semiconductor laser mounted on the optical head, a drive circuit for driving these elements, and a power source.

When the optical disk drive is sealed hermetically for the purpose of the dust-proofing measures as described above, heat from the respective heat generation sources is unlikely to be transferred, and the heat remains to be accumulated there. In particular, in the case of the semiconductor laser, there is a correlation between an operating temperature environment and the lifetime, and the lifetime of the element is shortened when it is used at a high temperature. Accordingly, it is desirable that this element is operated in an environment of as low a temperature as possible. However, in a recording operation using the element with a high power, the heat generated from the element itself becomes high.

Moreover, due to the hermetically sealed optical disk drive, the heat is accumulated, and the temperature of the element is raised beyond a guaranteed temperature range of the element set in consideration of the lifetime. Consequently, to ensure a sufficient reliability of the device, it is indispensable to take measures to radiate the heat from the semiconductor laser.

As a solution to the conflicting problems of dust-proofing and heat-radiation measures, an optical disk sub-system device is proposed in JP 8(1996)-102180A, for example. The optical disk sub-system device includes an optical disk drive, a power source for driving the optical disk drive, and a cooler for cooling the inside of a housing. In the device, the housing internally is partitioned into a first chamber and a second chamber by a sill plate, and the first chamber in which the optical disk drive and the cooler are disposed is sealed hermetically, and the cooler forms an internal air circulation path.

According to this conventional example, since the first chamber is sealed hermetically, the optical disk drive disposed therein is free from an adverse effect due to dust. In addition, since the cooler circulates air in the first chamber, a temperature distribution in the first chamber gradually is made homogeneous, and a temperature of a semiconductor laser mounted on an optical head also is reduced.

However, in this configuration, the internal air circulation path is formed in the hermetically sealed first chamber so as to form an airflow throughout the first chamber. While this airflow has an effect of causing heat transfer by which the temperature distribution in the chamber is made uniform, the heat transfer due to air cooling generally is effected more efficiently as an amount and speed of the airflow are higher.

Accordingly, when the amount or speed of the airflow is low with respect to an amount of heat generated from a heat source, the heat radiation effect with respect to the heat source is also small. The semiconductor laser has the lowest heat resistance among elements of the optical disk, and is a heat source. Thus, to suppress a rise in temperature of the semiconductor laser is the most effective way to improve the thermal reliability and durability of the device.

According to the device disclosed in JP 8(1996)-102180A, the airflow is formed throughout the first chamber, and thus it is a part of the airflow generated by a fan in flow amount and flow speed that reaches the semiconductor laser. With this configuration, it is less efficient in suppressing the rise in temperature of the semiconductor laser, and a sufficient heat radiation effect cannot be achieved. In this case, to increase the heat radiation effect with respect to the semiconductor laser, it is required to increase the flow amount by using a fan having a large diameter, and to increase the flow speed by increasing the rotation rate of the fan.

However, when the diameter of the fan is increased, the device becomes larger, resulting in a loss of saleability. Thus, there is a limit to the increase in the flow amount. Further, when the rotation rate of the fan is increased, the noise of the fan becomes higher, resulting in a loss of saleability. In addition, heat generation of the fan itself is increased, which reduces the heat radiation effect. Thus, there is also a limit to the increase in the flow speed.

As described above, with the configuration of JP 8(1996)-102180A, there is a limit to the achievement of a desired heat radiation effect with respect to the semiconductor laser, and it is impossible to ensure the thermal reliability and durability of the device.

Moreover, in the device of the above-described conventional example, since the air circulation path is formed to pass through a place other than the area in which the optical disk drive is configured, the entire device becomes larger, resulting in a loss of saleability.

DISCLOSURE OF INVENTION

The present invention has been made to solve the conventional problems as described above, and its object is to provide an optical disk device that has an improved thermal reliability and durability by suppressing a rise in temperature of a semiconductor laser through efficient heat transfer, while ensuring the dust proofing by hermetically sealing an optical disk drive.

To achieve the above object, an optical disk device of the present invention includes: an optical disk drive mechanism disposed in a housing-shape drive case, the optical disk drive mechanism including an optical head on which a semiconductor laser is mounted, a rotary driver for driving an optical disk, and a transfer mechanism for transferring the optical head; and an agitating fan for making air in the drive case flow. In the optical disk device, a wind path is formed so that the air in the drive case flows in a manner in which it is drawn toward an agitating fan side and the drawn air is discharged toward the optical head or the semiconductor laser by rotation of the agitating fan.

BEST MODE FOR CARRYING OUT THE INVENTION

Figure 1:
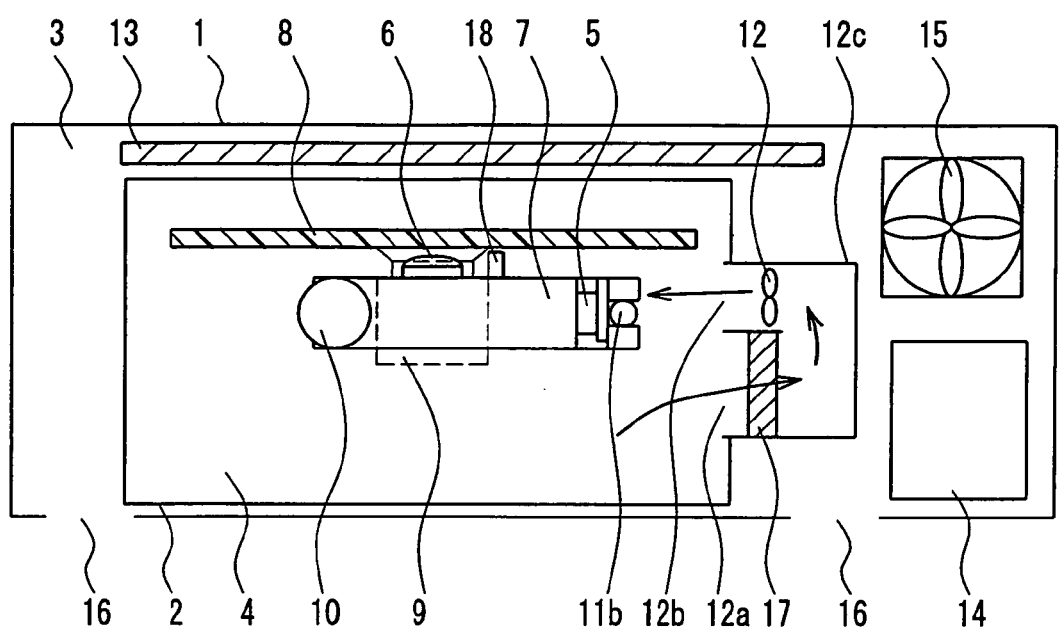
FIG. 1 is a front view schematically showing an internal structure of an optical disk device according to Embodiment 1 of the present invention.

According to the present invention, an optical head is set in a drive case so that the dust proofing is ensured, and air that is drawn from the inside of the drive case and is discharged from an agitating fan is blown toward the optical head or a semiconductor laser, whereby a rise in temperature of the semiconductor laser can be suppressed effectively, while the dust proofing is ensured.

In the optical disk device of the present invention, it is preferable that the drive case is disposed in a housing-shape main body case, the main body case internally being partitioned into the drive case and a deck area having an air hole for outside air, and a drive circuit for driving the optical disk drive mechanism and a power source for the drive circuit are disposed in the deck area. With this configuration, the deck area can be cooled with the outside air introduced from the air hole of the deck area, so that transfer of heat generated from the drive circuit and the power source to the inside of the drive case can be suppressed.

It is preferable that the drive case is disposed in a housing-shape main body case, the main body case internally being partitioned into the drive case and a deck area having an air hole for outside air, the optical head is constituted by a first optical head on which a short-wavelength semiconductor laser is mounted, and a second optical head on which a long-wavelength semiconductor laser is mounted. The optical disk drive mechanism includes the first and second optical heads, a first transfer mechanism for transferring the first optical head, a second transfer mechanism for transferring the second optical head, and rotary drivers provided independently for the respective first and second transfer mechanisms for driving the optical disk. The first and second transfer mechanisms are disposed in parallel with each other in a direction perpendicular to a transfer direction of the first and second optical heads, and in parallel with a surface of the optical disk mounted on either of the rotary drivers. A drive circuit for driving the optical disk drive mechanism, and a power source for the drive circuit are disposed in the deck area, and the agitating fan is disposed at a position opposed to the first transfer mechanism so that the air discharged from the agitating fan flows initially to the first transfer mechanism and then to the second transfer mechanism.

With this configuration in which the first and second optical heads are provided, since the first transfer mechanism for the short-wavelength semiconductor laser is disposed on a side nearer to the agitating fan, the short-wavelength semiconductor laser in which a temperature rise is greater than that of the long-wavelength semiconductor laser can be cooled efficiently.

Further, the deck area can be cooled with the outside air introduced from the air hole of the deck area, so that transfer of heat generated from the drive circuit and the power source to the inside of the drive case can be suppressed.

It is preferable that the short-wavelength semiconductor laser is disposed on a side face of the first optical head that is nearer to the agitating fan in the direction perpendicular to the transfer direction of the first optical head. With this configuration, the short-wavelength semiconductor laser can be cooled more efficiently.

It is preferable that the long-wavelength semiconductor laser is disposed on a side face of the second optical head that is nearer to the agitating fan in the direction perpendicular to the transfer direction of the second optical head. With this configuration, the long-wavelength semiconductor laser can be cooled more efficiently.

It is preferable that in a recording/reproducing operation with the second optical head, a position of the first transfer mechanism is varied so that the air discharged from the agitating fan can be blown toward the second optical head directly. With this configuration, even in the operation of the second optical head located farther from the position of the agitating fan, the airflow discharged from the agitating fan is blown toward the long-wavelength semiconductor laser directly without being raised in temperature nor being reduced in flow speed by being blocked by a shield, whereby the long-wavelength semiconductor laser can be cooled efficiently.

It is preferable that the wind path is formed so that air below the optical head is drawn, and the drawn air is discharged through the agitating fan toward the optical head or the semiconductor laser. With this configuration, low-temperature air below the optical head is blown toward the optical head or the semiconductor laser, whereby cooling can be performed efficiently.

It is preferable that a suction port for drawing the air in the drive case, and a discharge port for discharging the air in the drive case are formed on a side wall of the drive case, and the wind path is formed by a wind tube that connects the suction port and the discharge port and extends toward an outside of the drive case, and the agitating fan is disposed in the wind tube. With this configuration, the wind tube is disposed so as to extend toward the outside of the drive case, whereby the space in the deck area can be utilized effectively, and the agitating fan can be provided without making the device larger.

It is preferable that the wind tube is covered with a heat insulating material. With this configuration, it is possible to prevent air passing through the wind tube from being raised in temperature by heat from a circuit substrate or a power source disposed in the deck area. Thus, even in a recording operation using the semiconductor laser with a high power, the temperature of the semiconductor laser can be kept low.

It is preferable that a cooler for cooling air passing through the wind tube is included. With this configuration, the cooling effect achieved by the agitating fan can be increased, and a decrease in the cooling effect due to an ambient temperature condition can be suppressed.

It is preferable that the cooler is an air system. With this configuration, the structure is made simple.

It is preferable that the cooler is a heat pipe or a highly thermal conductive material attached to the wind tube. With this configuration, the cooling effect achieved by the agitating fan is increased excellently.

It is preferable that the cooler is a Peltier element. With this configuration, the cooling effect achieved by the agitating fan is increased excellently.

It is preferable that the agitating fan is disposed so that the air discharged from the agitating fan is blown toward the optical head or the semiconductor laser over a full movable range of the optical head. With this configuration, the temperature of the semiconductor laser always can be kept low.

It is preferable that a duct is disposed so that the air discharged from the agitating fan is blown toward the optical head or the semiconductor laser over a full movable range of the optical head. With this configuration, the temperature of the semiconductor laser always can be kept low.

It is preferable that the duct is a wind directing plate, a tilt angle of which is varied in conjunction with movement of the optical head in a radial direction of the optical disk, and the variation in the tilt angle allows a direction of an airflow discharged from the agitating fan to follow the movement of the optical head. With this configuration, even if the optical head is located at any position within a movable range, the airflow discharged from the agitating fan is blown toward the semiconductor laser directly, whereby the temperature of the semiconductor laser always is kept low.

It is preferable that a dust collecting filter is provided for collecting dust in the drawn air. With this configuration, dust in the drive case is eliminated when the air is drawn by the agitating fan, and as the suction is performed continuously, a cleaner environment is formed in the drive case.

It is preferable that a shield is provided on a straight line between a position from which an airflow discharged from the agitating fan is discharged to an inside of the drive case and an objective lens mounted on the optical head for focusing light of the semiconductor laser. With this configuration, a flow of air blown toward the objective lens can be disturbed before the objective lens, and thus dust included in the air can be prevented from being adhered to the objective lens.

Hereinafter, embodiments of the present invention will be described with reference to the drawings.

Embodiment 1

Figure 2:
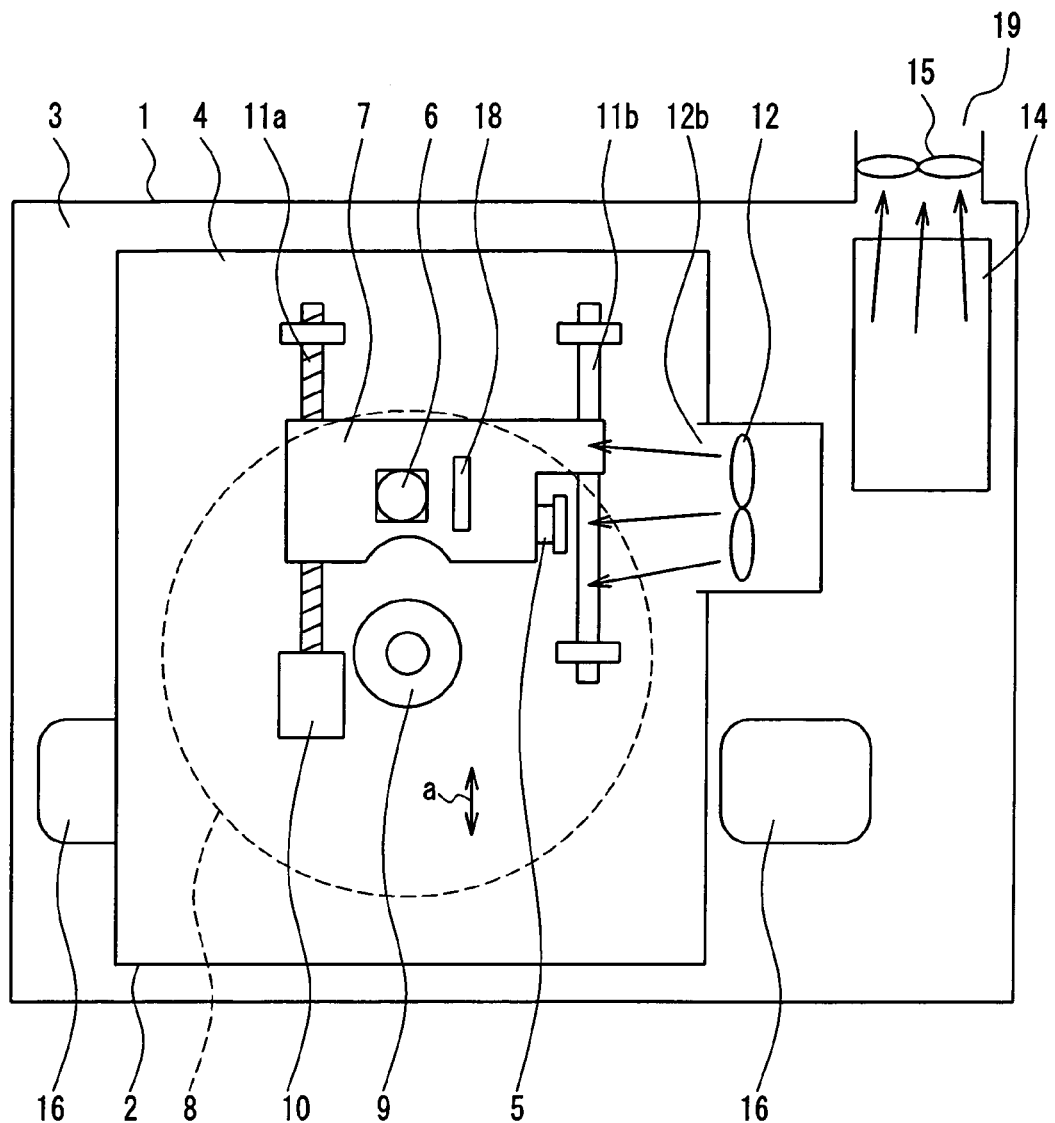
FIG. 2 is a plan view schematically showing the internal structure of the optical disk device shown in FIG. 1.

FIG. 1 is a front view schematically showing an internal structure of an optical disk device according to Embodiment 1 of the present invention, and FIG. 2 is a plan view schematically showing the internal structure of the optical disk device as shown in FIG. 1. In FIGS. 1 and 2, a housing-shape drive case 2 is mounted in a housing-shape main body case 1. The main body case 1 internally is partitioned into a deck area 3 and a drive area 4 by the drive case 2. The drive area 4 is sealed hermetically from outside air by the drive case 2.

As shown in FIG. 2, an optical head 7 is disposed in the drive area 4, and the optical head 7 is supported by guide shafts 11a and 11b. A semiconductor laser 5 as a light source for performing recording/reproduction, and an objective lens 6 for focusing light from the semiconductor laser 5 are mounted on the optical head 7. The guide shaft 11a is a screw shaft, and has its end portion connected to a rotation axis of a feed motor 10. The guide shafts 11a and 11b, and the feed motor 10 configure an optical head transfer mechanism.

An optical disk 8 is provided by being chucked on a disk motor 9 as a rotary driver. The optical disk 8 is irradiated with the light focused by the objective lens 6. The optical head 7, the disk motor 9, and the above-described optical head transfer mechanism configure an optical disk drive mechanism.

In the present embodiment, while not shown in the figures, a loading mechanism for carrying the optical disk 8 placed on a tray in the drive case 2 and carrying it out of the drive case 2, and a mechanism for opening and closing the drive case 2 for the carrying in and out are provided.

As shown in FIG. 1, a suction port 12a is provided at the bottom on a side face of the drive case 2. A discharge port 12b is formed on top of the suction port 12a. The suction port 12a and the discharge port 12b are connected by a wind tube 12c. The wind tube 12c is adhered to the drive case 2 so as not to lose the hermeticity of the drive area 4. An agitating fan 12 is provided in the wind tube 12c.

The wind tube 12c is disposed so as to extend toward the outside of the drive case 2. Thus, the space in the deck area 3 can be utilized effectively, and the agitating fan 12 can be provided without making the device larger.

By rotation of the agitating fan 12, air in the drive case 2 is drawn through the suction port 12a at the bottom of the drive case 2 toward the agitating fan 12, and is discharged to the inside of the drive case 2 from the upper discharge port 12b.

Since the agitating fan 12 and the semiconductor laser 5 are disposed so as to be opposed to each other, the airflow discharged from the agitating fan 12 is blown toward the semiconductor laser 5 directly.

In the deck area 3, a drive circuit 13 for driving the optical disk drive mechanism is disposed above the drive case 2. A power source 14 for supplying the drive circuit 13 with a power is disposed on a side of a side face of the drive case 2.

The operation of the optical disk device thus configured will be described more specifically. When the optical disk 8 is mounted on the disk motor 9, and the optical disk device starts a recording/reproducing operation, the power source 14 itself generates heat. Further, the power source 14 supplies a power to the semiconductor laser 5, the disk motor 9 for rotationally driving the optical disk 8, the feed motor 10 for generating a driving force to transfer the optical head 7 in a radial direction of the optical disk 8, and the drive circuit 13 for driving the optical disk drive mechanism. Accordingly, these elements also generate heat.

As shown in FIG. 2, a deck fan 15 is attached at a position of an exhaust hole 19 formed in the main body case 1, and air holes 16 are provided on a lower surface of the main body case 1. The deck fan 15 and the power source 14 are disposed in parallel with each other in a direction of a rotation axis of the deck fan 15. Further, as shown in FIG. 1, the deck fan 15 and the power source 14 are disposed in parallel with each other in a vertical direction seen from a front side of the deck fan 15.

By rotation of the deck fan 15, outside air is taken in the deck area 3 from the air holes 16, and the air in the deck area 3 is exhausted to the outside of the main body case 1 through the exhaust hole 19. Since the drive circuit 13 and the power source 14 are located in this airflow, the heat generated therefrom is transferred to the air supplied continuously from the outside, and this air is exhausted to the outside.

Consequently, the deck area 3 is cooled, and transfer of the heat generated from the drive circuit 13 and the power source 14 to the inside of the drive case 2 can be suppressed as much as possible. Further, due to the positional relationship between the deck fan 15 and the power source 14 as described above, heated air whose temperature has been raised due to the heat generation of the power source 14 can be exhausted efficiently.

On the other hand, in the drive case 2, the semiconductor laser 5, the disk motor 9, and the feed motor 10 generate heat, thereby effecting a temperature distribution. In this case, the heat from the semiconductor laser 5 as a light source has a tendency to be transferred upward due to natural heat radiation, and thus the drive area 4 has a lower temperature in a lower area than in an upper area in a height direction thereof.

Low-temperature air in the lower area is drawn through the suction port 12a, and is blown from the discharge port 12b toward the opposed semiconductor laser 5 directly by the rotation of the agitating fan 12. As a result, the heat from the semiconductor laser 5 can be radiated forcibly. In this case, since the semiconductor laser 5 and the discharge port 12b are opposed to each other, the low-temperature air in the lower area is blown toward the semiconductor laser 5 in the state where the wind generated by the agitating fan 12 has the highest flow amount and flow speed. Therefore, efficient heat transfer is caused, and a rise in temperature of the semiconductor laser 5 is suppressed effectively.

The air blown toward the semiconductor laser 5 flows in the upper area of the drive case 2, flows back to the lower area, and is drawn through the suction port 12a again. In other words, the rotation of the agitating fan 12 allows forced convection of the air in the drive case 2, so that it flows from the lower area to the upper area, and further from the upper area to the lower area. As a result, a rise in temperature of the disk motor 9 and the feed motor 10 as light sources other than the semiconductor laser 5 also can be suppressed.

Further, even if the optical head 7 is located at any position within a movable range in a radial direction (direction of an arrow a shown in FIG. 2) of the optical disk 8 ranging from an inner circumference to an outer circumference, the temperature of the semiconductor laser 5 always can be kept low by making the airflow discharged from the agitating fan 12 be blown toward the semiconductor laser 5. This can be realized by adjusting the disposed position of the agitating fan 12. More specifically, adjustment of the disposed position of the agitating fan 12 in the radial direction of the optical disk 8, the distance between the agitating fan 12 and the semiconductor laser 5, or the size of the discharge port 12b are performed.

As described above, according to the present embodiment, a rise in temperature of the semiconductor laser 5 can be suppressed effectively without making the device larger, while the dust proofing is ensured by hermetically sealing the drive case 2. Therefore, even in a recording operation using the semiconductor laser 5 with a high power, the temperature of the element can be kept low, and thus the lifetime of the element can be increased, whereby an optical disk device having a high reliability and durability with respect to heat and dust can be realized.

In the present embodiment, while the airflow discharged from the agitating fan is blown toward the semiconductor laser, the discharged airflow is blown not only toward the semiconductor laser but also toward the optical head in the vicinity thereof. Thus, the cooling effect also is increased with respect to an LSI and circuit components for driving the semiconductor laser disposed in the vicinity of the semiconductor laser. This also applies to the following embodiments.

As described above, in the present embodiment, the main body case 1 internally is partitioned into the hermetically sealed drive area 4 and the deck area 3 having permeability to outside air by the drive case 2. Therefore, the dust proofing is ensured in the drive area 4, and the dust proofing of an optical system of the optical head 7, in particular, the objective lens 6 also is ensured.

However, when the optical disk is loaded and unloaded, a part of the drive case 2 is opened. Accordingly, dust may enter the drive area 4, and an optical disk to which dust is attached may be taken in the drive area 4.

When the optical disk 13 as a commutative medium to which dust is attached is mounted on the disk motor 9, the dust is diffused in the drive case 2 by air agitated by rotation of the optical disk 13 or an airflow generated by the agitating fan 12.

In the present embodiment, as shown in FIG. 1, a dust collecting filter 17 is attached to the suction port 12a, so that the dust is eliminated by the dust collecting filter 17 when air is drawn through the suction port 12a. By repeating this operation, a cleaner environment is formed in the drive case 2.

In the case where a part of the dust is not eliminated even after the air passes through the dust collecting filter 17, or where dust floating in the drive case 2 is involved in the airflow from the discharge port 12b, the dust may be attached to the objective lens 6. In the present embodiment, a shield 18 is provided on the optical head 7 on a straight line between the discharge port 12b and the objective lens 6. Thus, the discharged airflow blown toward the objective lens 6 can be disturbed before the objective lens, so that the dust included in the discharged airflow is prevented from being attached to the objective lens 6.

Figure 3:
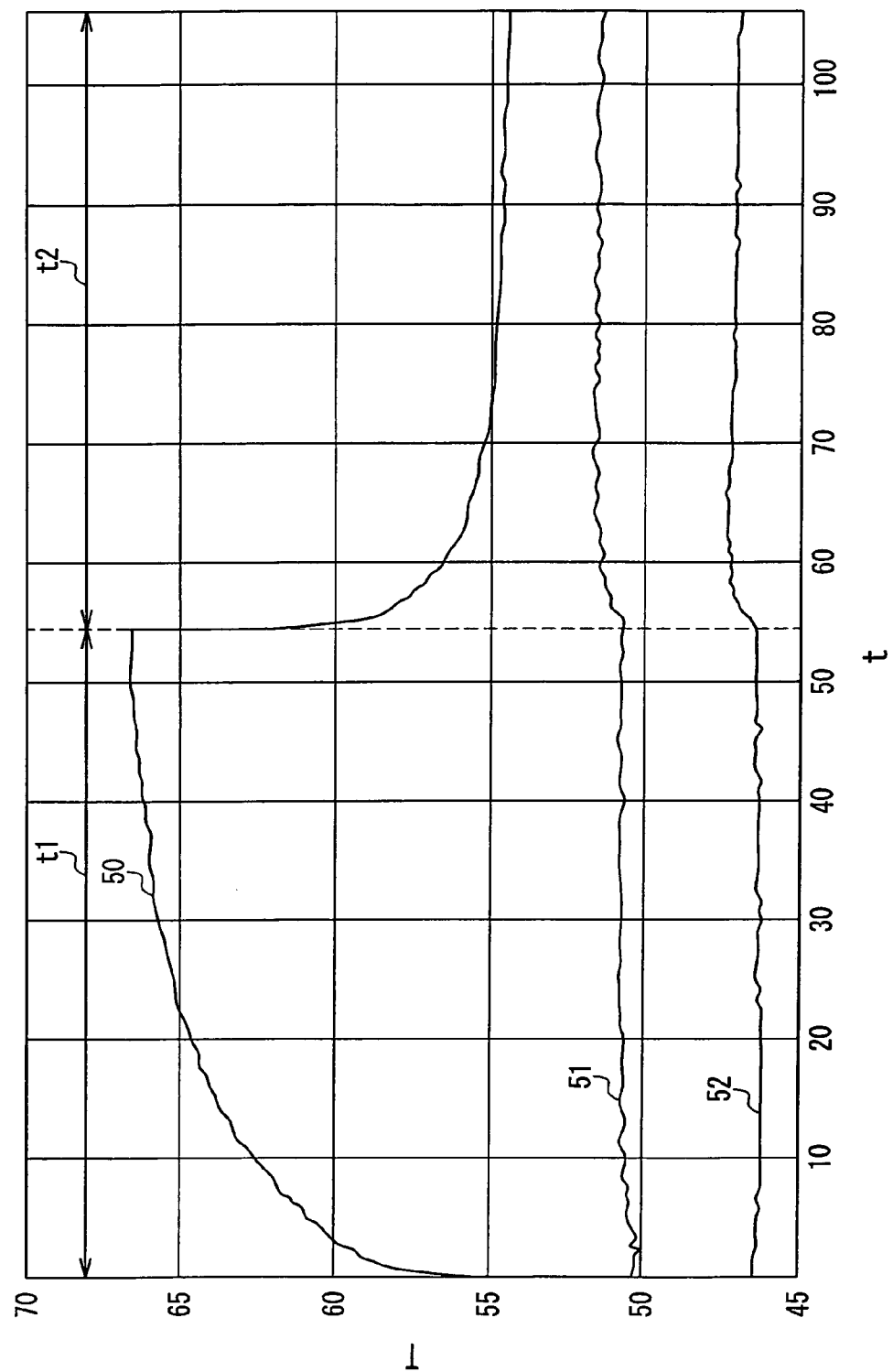
FIG. 3 is a view showing an experimental result with respect to the optical disk device according to Embodiment 1 of the present invention.

Hereinafter, a description will be given of an experiment performed to confirm the effect of the present embodiment. FIG. 3 is a graph showing the result of the experiment, wherein a horizontal axis indicates a time t (minute) elapsed from the start of an operation, and a horizontal axis indicates a temperature T (° C.). An interval shown with t1 is an interval for which the operation of the agitating fan 12 is stopped, and an interval shown with t2 is an interval for which the agitating fan 12 is operated. A line 50 indicates a temperature of the semiconductor laser 5, a line 51 indicates a temperature in an upper space in the drive case 2, and a line 52 indicates a temperature in a lower space in the drive case 2.

With respect to the interval t1, the temperature in the space in the drive case 2 hardly is varied even with the elapse of time. To the contrary, the temperature of the semiconductor laser 5 is raised with the elapse of time, resulting in a maximum temperature difference of approximately 20° C. between the temperatures of the semiconductor laser and that in the lower space in the drive case 2.

On the other hand, with respect to the interval t2 for which the agitating fan 12 is operated, the temperature of the semiconductor laser 5 decreases sharply, and becomes almost stable at a value approximately 12° C. lower than its maximum value in the interval t2 after the elapse of 100 minutes.

Such a significant drop in temperature is ascribed to the fact that air in the lower space in the drive case 2 whose temperature is about 20° C. lower than that of the semiconductor laser 5 is blown toward the semiconductor laser 5 directly. Accordingly, the effect of the present embodiment was confirmed.

Embodiment 2

Figure 4:
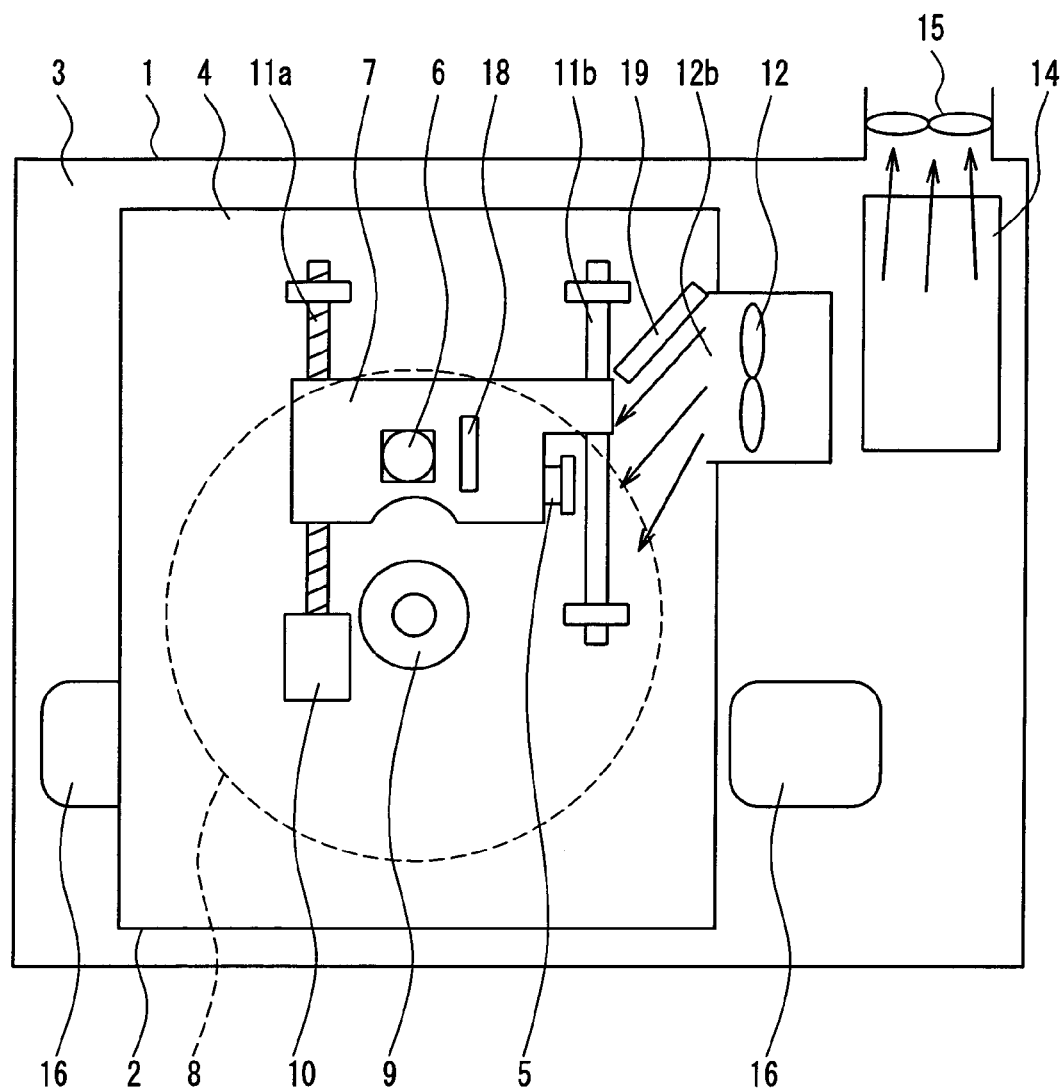
FIG. 4 is a plan view schematically showing an internal structure of an optical disk device according to Embodiment 2 of the present invention.

(65) FIG. 4 is a plan view schematically showing an internal structure of an optical disk device according to Embodiment 2 of the present invention. In FIG. 4, parts operated in the same way as those shown in FIG. 2 are denoted by the same reference numerals.

In FIG. 4, a duct 19 is provided in the vicinity of the discharge port 12b. The duct 19 is disposed so as to allow an airflow discharged from the discharge port 12b to flow toward the semiconductor laser 5.

In the configuration shown in FIG. 4, although the semiconductor laser 5 and the discharge port 12b are not disposed so as to be opposed to each other, the duct 19 allows the direction of the discharged airflow to be varied, so that the airflow discharged from the agitating fan 12 can be blown toward the semiconductor laser 5 directly. Also in this configuration, air in a lower area of the drive case 2 is drawn and blown toward the semiconductor laser 5 directly as in Embodiment 1.

The duct 19 can be formed of a flat plate member, and it is possible to vary the direction of the discharged airflow with a simple structure.

According to the present embodiment, even in the case where the semiconductor laser 5 and the discharge port 12b are not opposed to each other, the provision of the duct 9 allows the discharged airflow to be blown toward the semiconductor laser 5 directly with a simple structure, resulting in the same effect as that in Embodiment 1.

Embodiment 3

Figure 5:
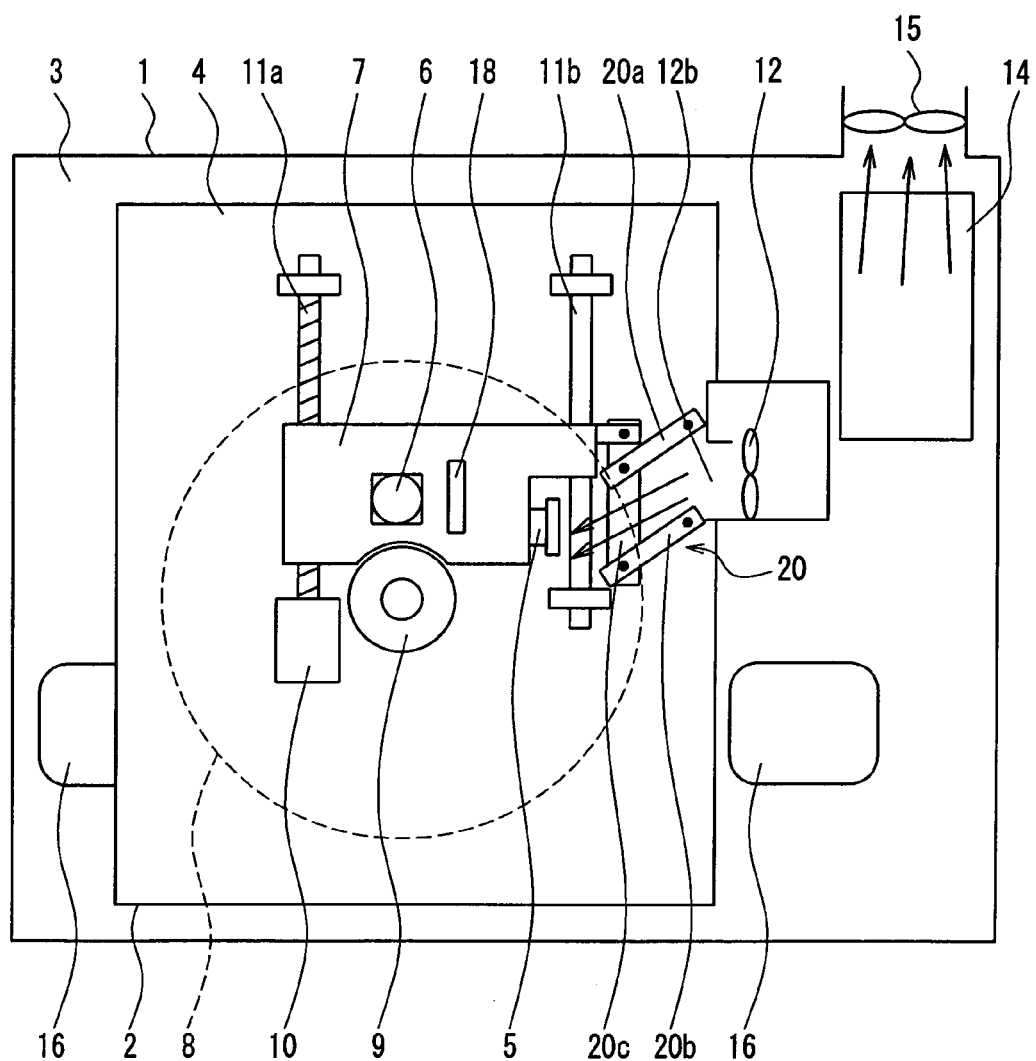
FIG. 5 is a plan view schematically showing an internal structure of an optical disk device according to Embodiment 3 of the present invention in the state where an optical head 7 is located on an inner circumference side of an optical disk 8.
Figure 6:
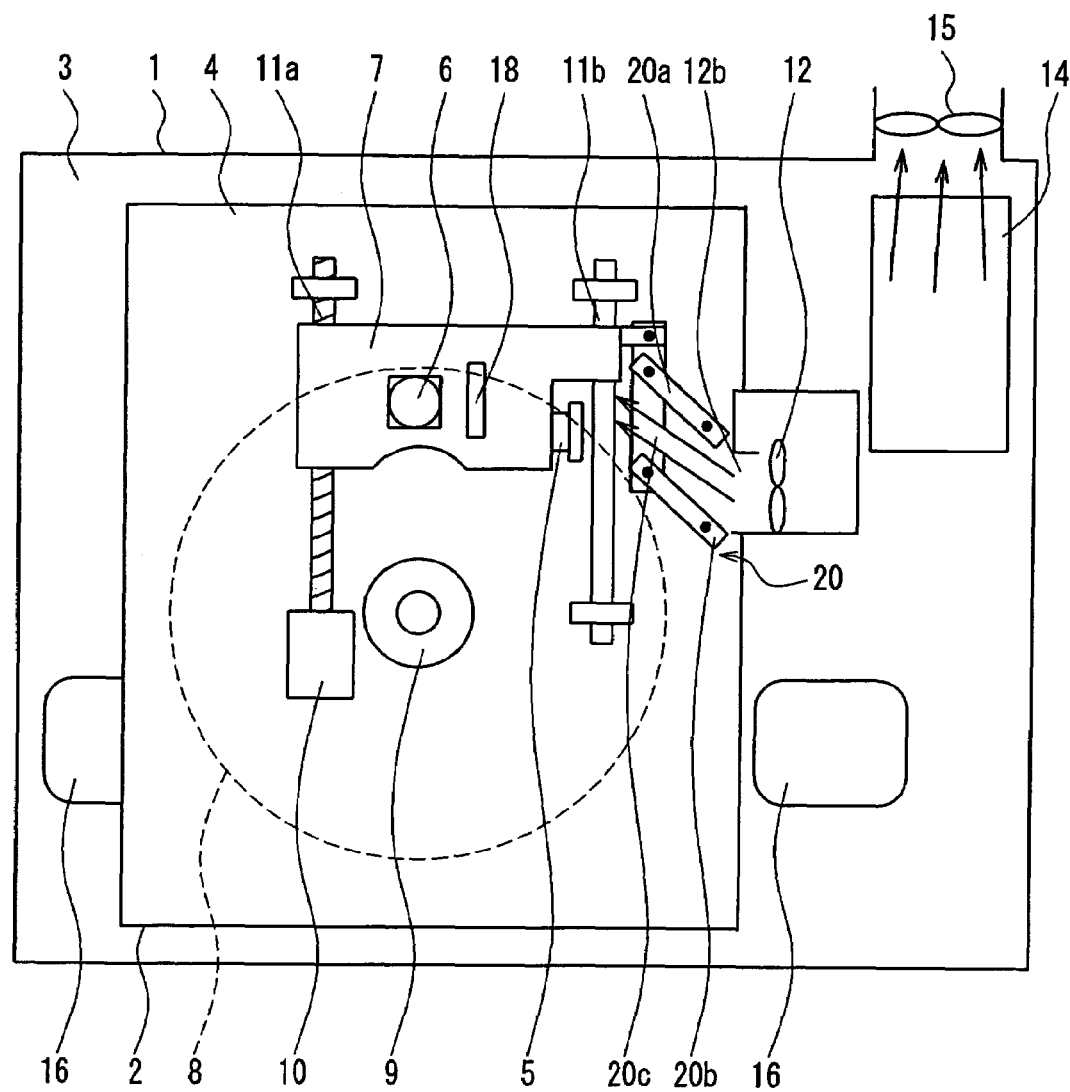
FIG. 6 is a plan view schematically showing an internal structure of the optical disk device according to Embodiment 3 of the present invention in the state where the optical head 7 is located on an outer circumference side of the optical disk 8.

FIGS. 5 and 6 are plan views schematically showing internal structures of an optical disk device according to Embodiment 3 of the present invention. In FIGS. 5 and 6, parts operated in the same way as those shown in FIG. 2 are denoted by the same reference numerals. FIG. 5 shows the state where the optical head 7 is located on an inner circumference side of the optical disk 8, and FIG. 6 shows the state where the optical head 7 is located on an outer circumference side of the optical disk 8.

A wind directing plate 20 forming a duct is configured such that two slats 20a and 20b are connected by a connecting plate 20c, resulting in a parallel link. One end of each of the two slats 20a and 20b is fixed to the drive case 2 so as to be capable of turning, and the other end is fixed to the connecting plate 20c so as to be capable of turning. Such fixing can be realized by engaging a protruding pin with a hole provided in each of the slats 20a and 20b. The connecting plate 20c is fixed to the optical head 7, and thus is moved in conjunction with the optical head 7.

As shown in FIG. 5, when the optical head 7 is moved toward the inner circumference side of the optical disk 8, a driving force in a translational direction acts on the connecting plate 20c by the movement of the optical head 7, so that the slats 20a and 20b turn toward the inner circumference side of the optical disk 8, resulting in the formation of a duct directed from the discharge port 12b to the semiconductor laser 5. Accordingly, an airflow discharged from the discharge port 12b is blown toward the semiconductor laser 5 directly.

As shown in FIG. 6, when the optical head 7 is moved toward the outer circumference side of the optical disk 8, the slats 20a and 20b turn toward the outer circumference side of the optical disk 8, resulting in the formation of a duct directed from the discharge port 12b to the semiconductor laser 5. Accordingly, an airflow discharged from the discharge port 12b is blown toward the semiconductor laser 5 directly.

According to the present embodiment, the wind directing plate 20 turns in conjunction with the movement of the optical head 7, so that a tilt angle of the wind directing plate 20 is varied, whereby the direction of the airflow discharged from the agitating fan 12 is varied. The variation in the tilt angle allows the direction of the discharged airflow to follow the movement of the optical head 7. Therefore, even if the optical head 7 is located at any position in a movable range, the airflow discharged from the agitating fan 12 can be blown toward the semiconductor laser 5 directly, whereby the temperature of the semiconductor laser 5 always is kept low.

Further, since the wind directing plate 20 forms the duct capable of controlling the direction of the wind, almost the entire discharged airflow can be blown toward the semiconductor laser 5 directly. Thus, more efficient heat transfer can be caused, and a rise in temperature of the semiconductor laser 5 can be suppressed more effectively. Furthermore, since it is possible to utilize the capability of the agitating fan 12 efficiently as described above, the agitating fan 12 can be made smaller, and accordingly the device can be made smaller.

Embodiment 4

Figure 7:
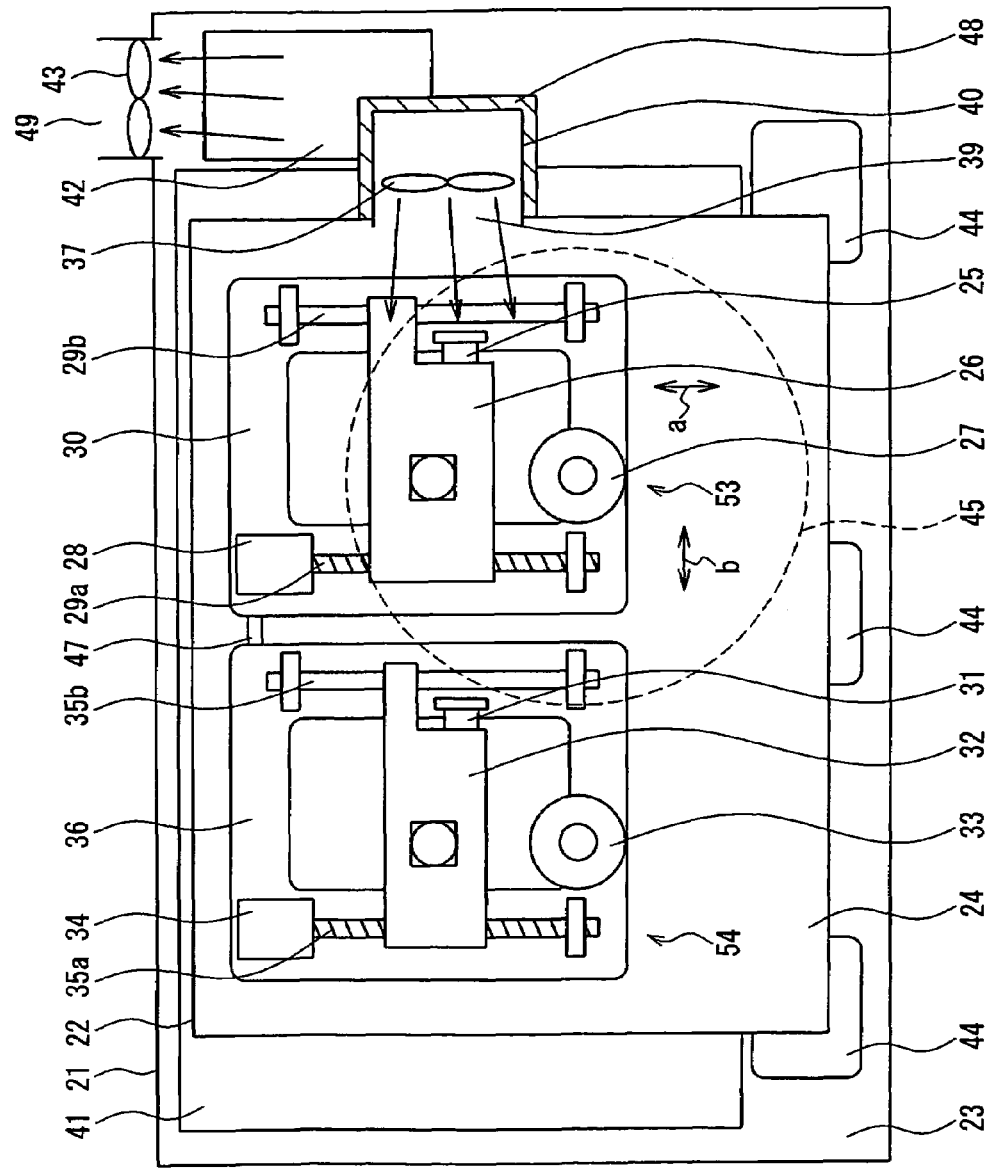
FIG. 7 is a plan view schematically showing an internal structure of an optical disk device according to Embodiment 4 of the present invention.
Figure 8:
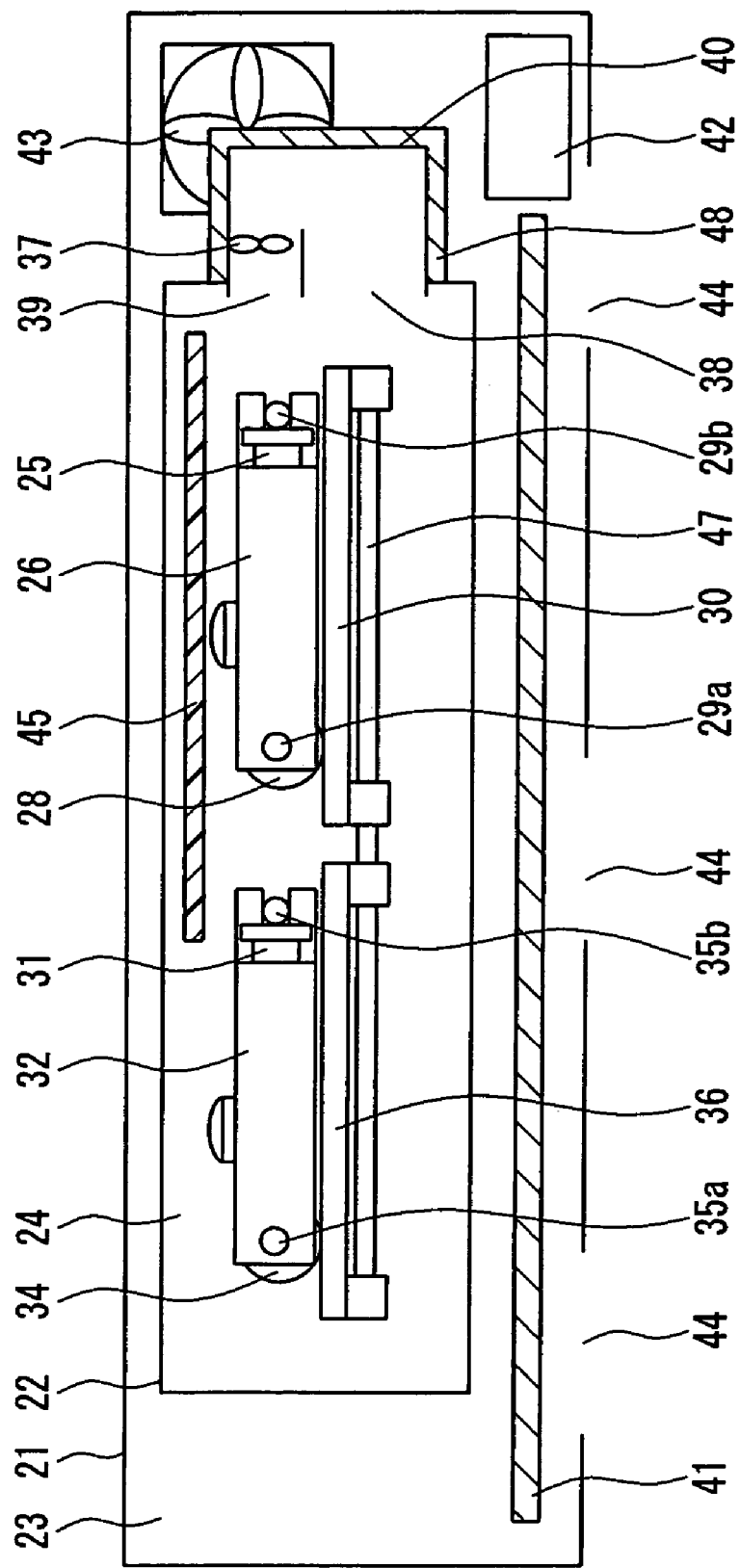
FIG. 8 is a front view schematically showing the internal structure of the optical disk device shown in FIG. 7.
Figure 9:
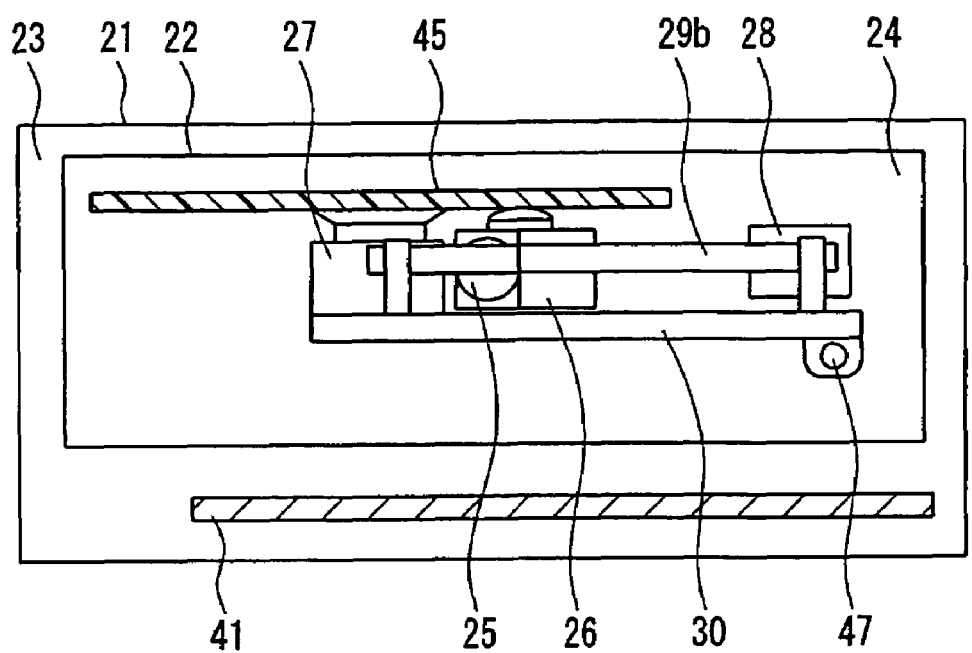
FIG. 9 is a side view schematically showing the internal structure of the optical disk device shown in FIG. 7.

FIG. 7 is a plan view schematically showing an internal structure of an optical disk device according to Embodiment 4 of the present invention. FIG. 8 is a front view schematically showing the internal structure of the optical disk device shown in FIG. 7. FIG. 9 is a side view schematically showing the internal structure of the optical disk device shown in FIG. 7.

Figure 10:
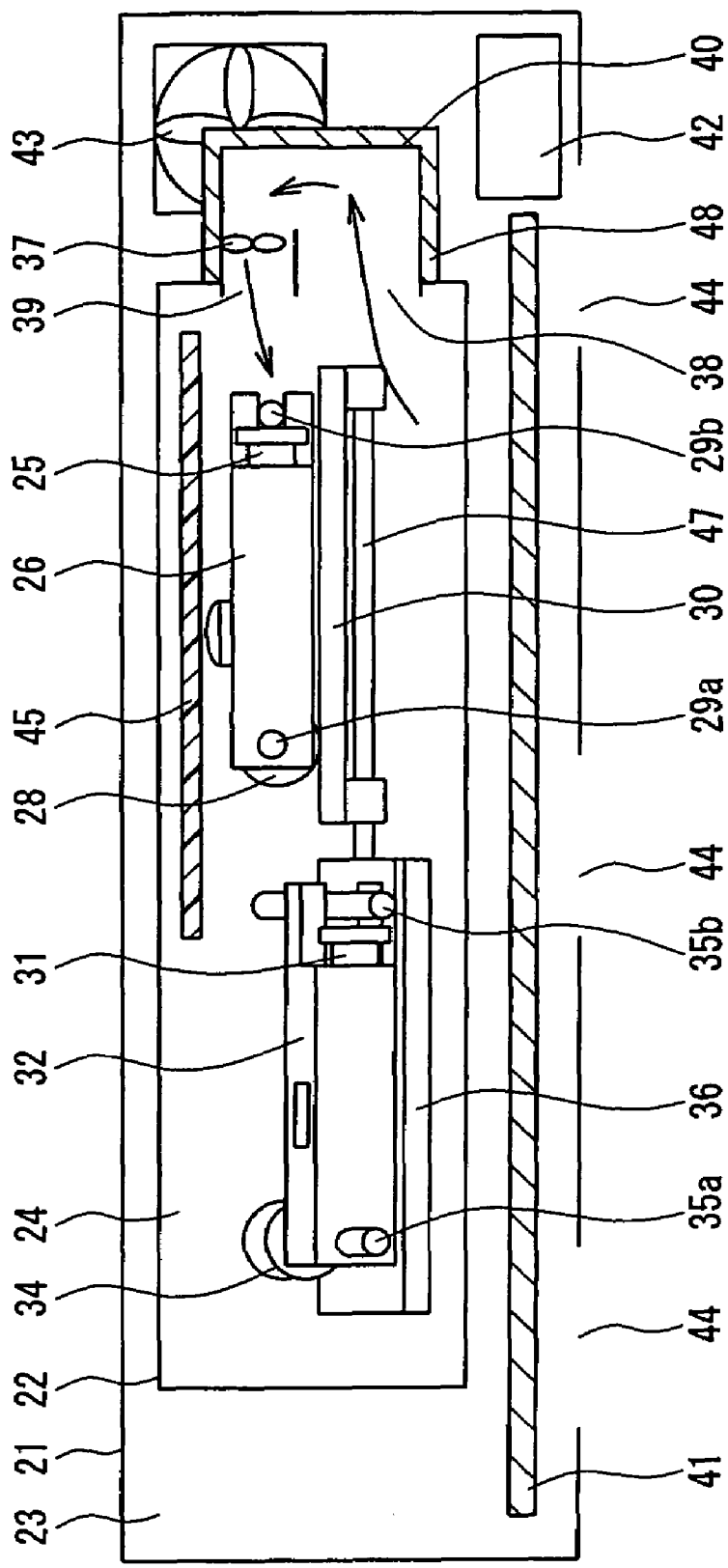
FIG. 10 is a front view schematically showing an internal structure of the optical disk device shown in FIG. 7 when a first optical head 26 is operated.
Figure 11:
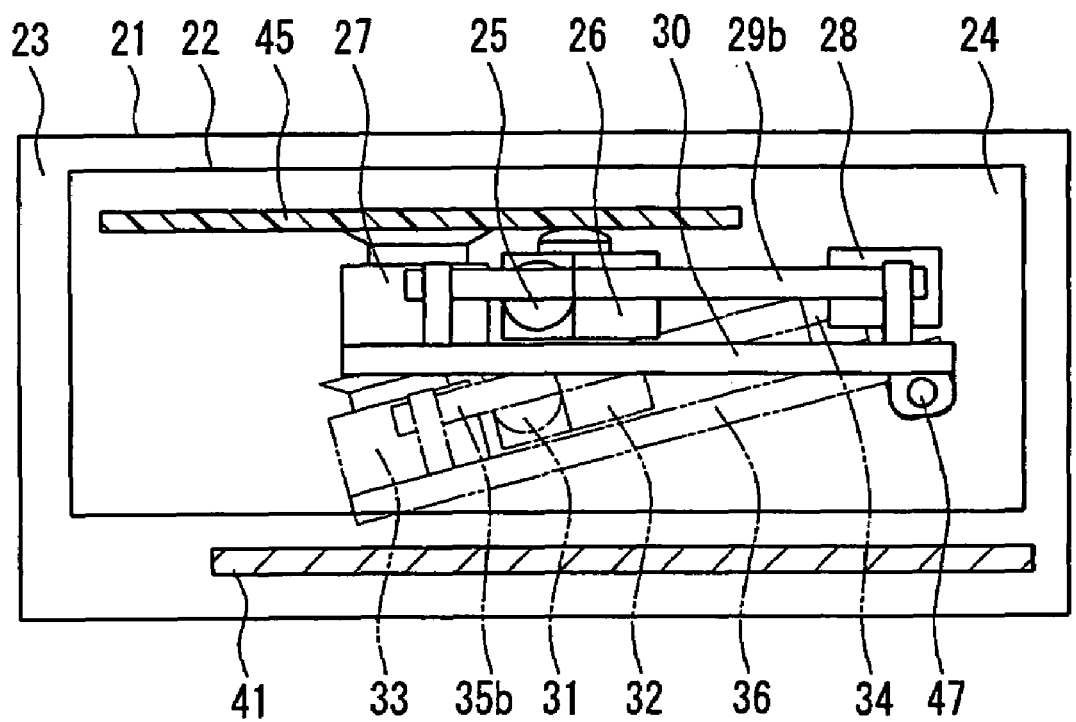
FIG. 11 is a side view schematically showing the internal structure of the optical disk device in the state shown in FIG. 10.

FIG. 10 is a front view schematically showing an internal structure of the optical disk device shown in FIG. 7 when a first optical head 26 is operated. FIG. 11 is a side view schematically showing the internal structure of the optical disk device in the state shown in FIG. 10.

Figure 12:
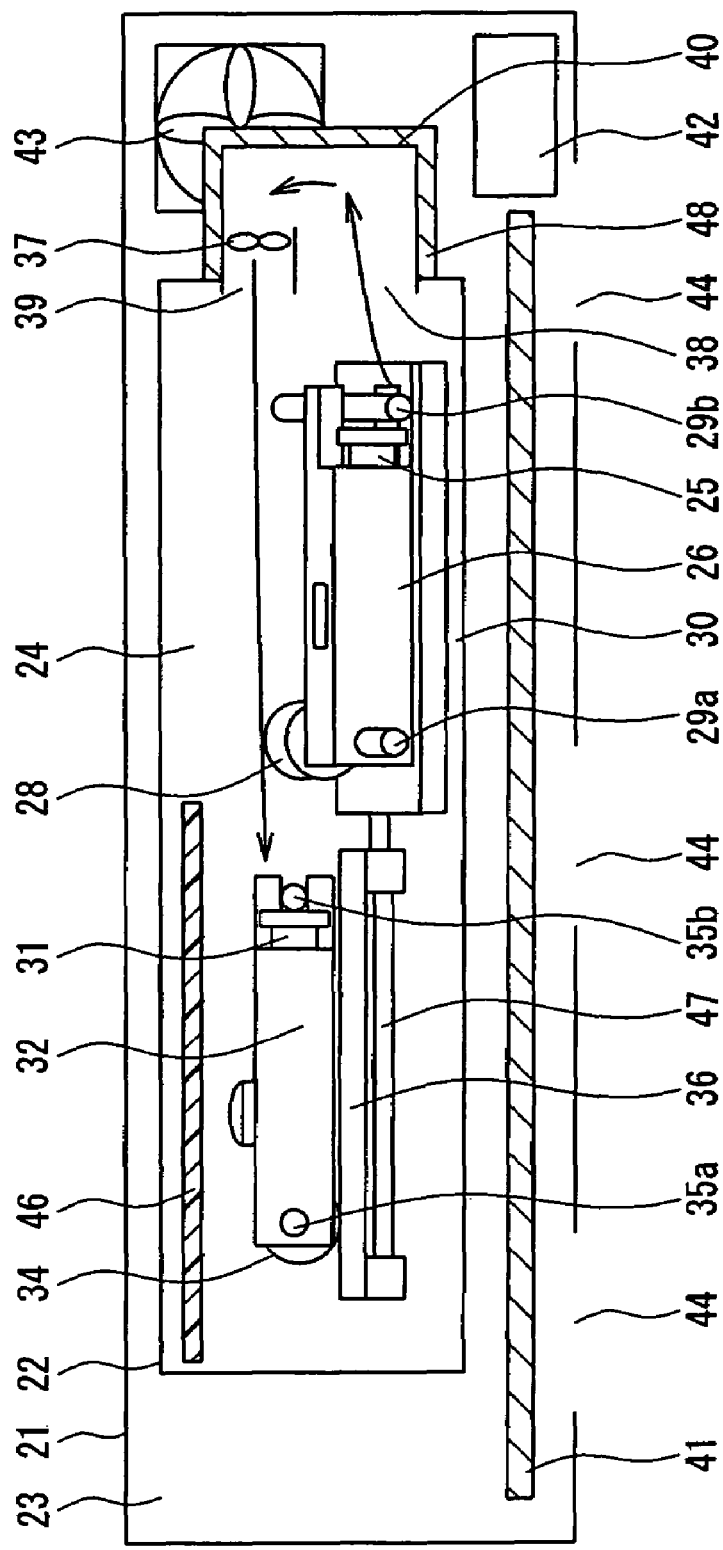
FIG. 12 is a front view schematically showing an internal structure of the optical disk device shown in FIG. 7 when a second optical head 32 is operated.
Figure 13:
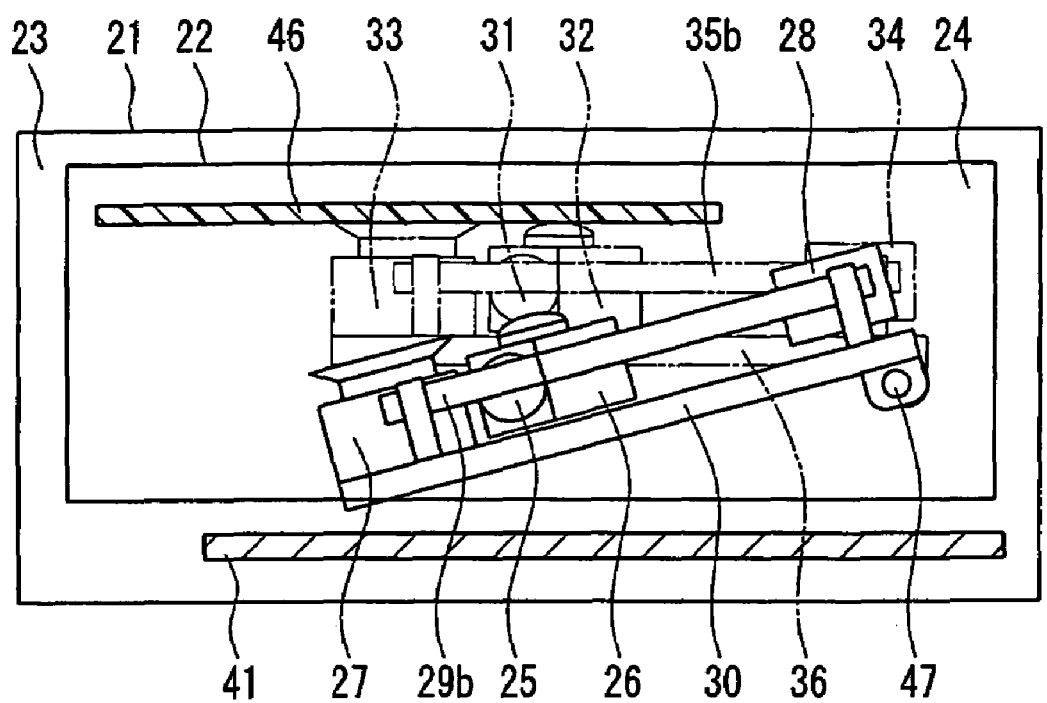
FIG. 13 is a side view schematically showing the internal structure of the optical disk device in the state shown in FIG. 12.

FIG. 12 is a front view schematically showing an internal structure of the optical disk device shown in FIG. 7 when a second optical head 32 is operated. FIG. 13 is a side view schematically showing the internal structure of the optical disk device in the state shown in FIG. 12.

As shown in FIG. 7, a drive case 22 is mounted in a main body case 21 of the optical disk device. The main body case 21 internally is partitioned into a deck area 23 and a drive area 24 by the drive case 22. The drive area 24 is sealed hermetically from outside air.

In the drive area 24, the first optical head 26 on which a blue laser 25 as a light source for recording/reproduction with a short wavelength is mounted is disposed and supported by first guide shafts 29a and 29b. The first guide shaft 29a is a screw shaft, and has its end portion connected to a rotation axis of a first feed motor 28.

An optical disk 45 for the blue laser is chucked on a first disk motor 27 as a rotary driver, and is driven rotationally. The first disk motor 27, the first guide shafts 29a and 29b supporting the first optical head 26, and the first feed motor 28 are fixed on a first transfer base 30. Theses elements configure a first transfer mechanism 53.

The second optical head 32 on which a red laser 31 as a light source for recording/reproduction with a long wavelength is mounted is disposed and supported by second guide shafts 35a and 35b. The second guide shaft 35a is a screw shaft, and has its end portion connected to a rotation axis of a second feed motor 34.

An optical disk 46 (see FIG. 12) for the red laser is chucked on a second disk motor 33 as a rotary driver, and is driven rotationally. The second disk motor 33, the second guide shafts 35a and 35b supporting the second optical head 32, and the second feed motor 34 are fixed on a second transfer base 36. Theses elements configure a second transfer mechanism 54.

The first transfer base 30 and the second transfer base 36 are disposed in parallel with each other in a direction (direction of an arrow b) perpendicular to a transfer direction of the first and second transfer bases 30 and 36, in a plane parallel to a surface of the blue laser optical disk 45 or the red laser optical disk 46, and are supported by a hoisting/lowering turning axis 47 so as to freely turn independently.

In the above-described configuration, the first and second optical heads 26 and 32, the first and second disk motors 27 and 33, and the first and second transfer mechanisms 53 and 54 configure an optical disk drive mechanism.

While not shown in the figures, a loading mechanism for carrying the blue laser optical disk 45 and the red laser optical disk 46 placed on a tray in the drive case 22 and carrying them out of the drive case 22 independently, and a mechanism for opening and closing the drive case 22 for the carrying in and out are provided.

As shown in FIG. 8, a suction port 38 is provided at the bottom on a side face of the drive case 22. A discharge port 39 is formed on top of the suction port 38. The suction port 38 and the discharge port 39 are connected by a wind tube 40. The wind tube 40 is adhered to the drive case 22 so as not to lose the hermeticity of the drive area 24. An agitating fan 37 is provided in the wind tube 40.

The wind tube 40 is disposed so as to extend toward the outside of the drive case 22. Thus, the space in the deck area 23 can be utilized effectively, and the agitating fan 37 can be provided without making the device larger.

The discharge port 39 and the blue laser 25 are disposed so as to be opposed to each other so that an airflow discharged from the discharge port 39 is blown toward the blue laser 25 directly. Further, a protruding portion in which the wind tube 40 is formed is covered with a heat insulating material 48.

As shown in FIG. 8, in the deck area 23 in the case main body 21, a circuit substrate 41 for driving the first and second transfer mechanisms is disposed below the drive case 22, and a power source 42 for supplying the circuit substrate 41 with a power is disposed on a side of a side face of the drive case 22.

The operation of the optical disk device thus configured will be described more specifically.

As shown in FIG. 7, in a recording/reproducing operation with the first optical head 26, the blue laser optical disk 45 is mounted on the disk motor 27, and the optical disk device starts the recording/reproducing operation. In this state, the second optical head 32 is in a non-operational state, and as shown in FIG. 10, the second transfer base 36 turns about the hoisting/lowering turning axis 47 to be inclined, so that the second optical head 32 is located at a position lowered from a position in the recording/reproducing operation.

When the recording/reproducing operation with the first optical head 26 is started, the power source 42 itself generates heat. Further, the power source 42 supplies a power to the blue laser 25 of the optical head 7, the first disk motor 27 for rotationally driving the optical disk 45, the first feed motor 28 for generating a driving force to transfer the first optical head 26 in a radial direction of the optical disk 45, and the drive circuit 41 for driving the optical disk drive mechanism. Accordingly, these elements also generate heat.

As shown in FIG. 7, a deck fan 43 is attached at a position of an exhaust hole 49 formed in the housing 21, and air holes 44 are provided on a lower surface of the housing 21. The deck fan 43 and the power source 42 are disposed in parallel with each other in a direction of a rotation axis of the deck fan 43. Further, as shown in FIG. 8, the deck fan 43 and the power source 42 are disposed in parallel with each other in a vertical direction seen from a front side of the deck fan 43.

By rotation of the deck fan 43, outside air is taken in the deck area 23 from the air holes 44, and the air in the deck area 23 is exhausted to the outside of the housing 21 through the exhaust hole 49.

Since the circuit substrate 41 and the power source 42 are located in this airflow, the heat generated therefrom is transferred to the air supplied continuously from the outside, and this air is exhausted to the outside. Consequently, the deck area 23 is cooled, and transfer of the heat generated from the circuit substrate 41 and the power source 42 to the inside of the drive case 22 is suppressed as much as possible.

Further, due to the positional relationship between the deck fan 43 and the power source 42 as described above, heated air whose temperature has been raised due to the heat generation of the power source 42 can be exhausted efficiently.

Furthermore, since the wind tube 40 is covered with the heat insulating material 48, it is possible to prevent air passing through the wind tube 40 from being raised in temperature by the heat from the circuit substrate 41 or the power source 42 disposed in the deck area 23. Thus, even in a recording operation using the semiconductor laser with a high power, the temperature of the semiconductor laser can be kept low.

On the other hand, in the drive case 22, the blue laser 25, the first disk motor 27, and the first feed motor 28 generate heat, thereby effecting a temperature distribution. In this case, the heat from the blue laser 25 as a light source has a tendency to be transferred upward due to natural heat radiation, and thus the drive area 24 has a lower temperature in a lower area than in an upper area in a height direction thereof As shown in FIG. 10, low-temperature air in the lower area is drawn through the suction port 38, and is blown from the discharge port 39 toward the opposed blue laser 25 directly by rotation of the agitating fan 37. As a result, the heat from the blue laser 25 can be radiated forcibly. In this case, since the blue laser 25 and the discharge port 39 are opposed to each other, the low-temperature air in the lower area is blown toward the blue laser 25 in the state where the wind generated by the agitating fan 37 has the highest flow amount and flow speed. Therefore, efficient heat transfer is caused, and a rise in temperature of the blue laser 25 is suppressed effectively.

The air blown toward the blue laser 25 flows in the upper area of the drive case 22, flows back to the lower area, and is drawn through the suction port 38 again. In other words, the rotation of the agitating fan 37 allows forced convection of the air in the drive case 22, so that it flows from the lower area to the upper area, and further from the upper area to the lower area. As a result, a rise in temperature of the first disk motor 27 and the first feed motor 28 as heat sources other than the blue laser 25 also can be suppressed.

Further, even if the first optical head 26 is located at any position within a movable range, the temperature of the blue laser 25 always can be kept low by making the airflow discharged from the agitating fan 37 be blown toward the blue laser 25. This can be realized by adjusting the disposed position of the agitating fan 37. More specifically, adjustment of the disposed position of the agitating fan 37 in the radial direction of the optical disk, the distance between the agitating fan 37 and the semiconductor laser 25, or the size of the discharge port 39 are performed.

While the first and second optical heads 26 and 32 are disposed in parallel with each other, the first optical head 26 for the blue laser 25 is disposed on a side nearer to the agitating fan 37. Further, the blue laser 25 is disposed on a side face of the first optical head 26 that is nearer to the agitating fan 37 in a direction perpendicular to a transfer direction of the first optical head 26. Consequently, the short-wavelength blue laser 25 in which a temperature rise is greater than that of the red laser 31 can be cooled efficiently.

In a recording/reproducing operation with the second optical head 32, the red laser optical disk 46 (FIG. 12) is mounted on the second disk motor 33 shown in FIG. 7. When the optical disk device starts the recording/reproducing operation, the power source 42 itself generates heat. Further, the power source 42 supplies a power to the red laser 31, the second disk motor 33 for rotationally driving the optical disk 46, the second feed motor 34 for generating a driving force to transfer the second optical head 32 in a radial direction of the optical disk 46, and the drive circuit 41 for driving the optical disk drive mechanism. Accordingly, these elements also generate heat.

In this state, the first optical head 26 is in a non-operational state, and as shown in FIG. 12, the first transfer base 30 turns about the hoisting/lowering turning axis 47 to be inclined, so that the first optical head 26 is located at a position lowered from a position in the recording/reproducing operation.

By rotation of the deck fan 43, air flows from the air holes 44 to the deck fan 43 in the deck area 23. Therefore, transfer of the heat generated from the circuit substrate 41 and the power source 42 to the inside of the drive case 22 can be suppressed. This is the same as in the case where the first optical head 26 is operated.

In the drive case 22, the red laser 31, the second disk motor 33, and the second feed motor 34 generate heat, thereby effecting a temperature distribution. In this case, the heat from the light source has a tendency to be transferred upward due to natural heat radiation, and thus the drive area 24 has a lower temperature in a lower area than in an upper area in a height direction thereof.

Here, the first optical head 26 is in a non-operational state as described above, and a rise in temperature caused by the first optical head 26 itself is not observed around the first optical head 26. Further, as shown in FIGS. 12 and 13, the first optical head 26 turns downward about the turning axis 47. Furthermore, the red laser 31 is disposed on a side face of the second optical head 32 that is nearer to the agitating fan 37 in a direction perpendicular to a transfer direction of the second optical head 32.

Therefore, the airflow discharged from the agitating fan 37 is blown toward the red laser 31 directly through a space made above the first optical head 26 as shown in FIG. 12 without being raised in temperature nor being reduced in flow speed by being blocked by a shield. In other words, low-temperature air in the lower area of the drive case 22 is drawn through the suction port 38, and is blown from the discharge port 39 toward the opposed red laser 31 directly by rotation of the agitating fan 37. As a result, the heat from the red laser 31 can be radiated forcibly.

The air blown toward the red laser 31 flows back to the lower area, and is drawn through the suction port 38 again. In other words, the rotation of the agitating fan 37 allows forced convection of the air in the drive case 22, so that it flows from the lower area to the upper area, and further from the upper area to the lower area. As a result, a rise in temperature of the second disk motor 33 and the second feed motor 34 as heat sources other than the red laser 31 also can be suppressed.

In the present embodiment, the two-head unit is used. As described above, even in the operation of the optical head for the red laser located at a position farther from the agitating fan 37, the airflow discharged from the agitating fan 37 is blown toward the red laser 31 directly through the space made above the first optical head 26 without being raised in temperature nor being reduced in flow speed by being blocked by a shield. Thus, there is no need to provide an additional agitating fan 37 particularly, and the single agitating fan 37 is sufficient, whereby upsizing of the device can be suppressed.

Further, the dust proofing of the drive area 24 is ensured, and the dust proofing of an optical system of the optical heads 26 and 32, in particular, an objective lens also is ensured as in Embodiment 1.

As described above, the two-head unit is used in the present embodiment. However, as in Embodiment 1, a rise in temperature of the semiconductor laser can be suppressed effectively without making the device larger, thereby realizing an optical disk device having a high reliability and durability with respect to heat and dust.

Embodiment 5

Figure 14:
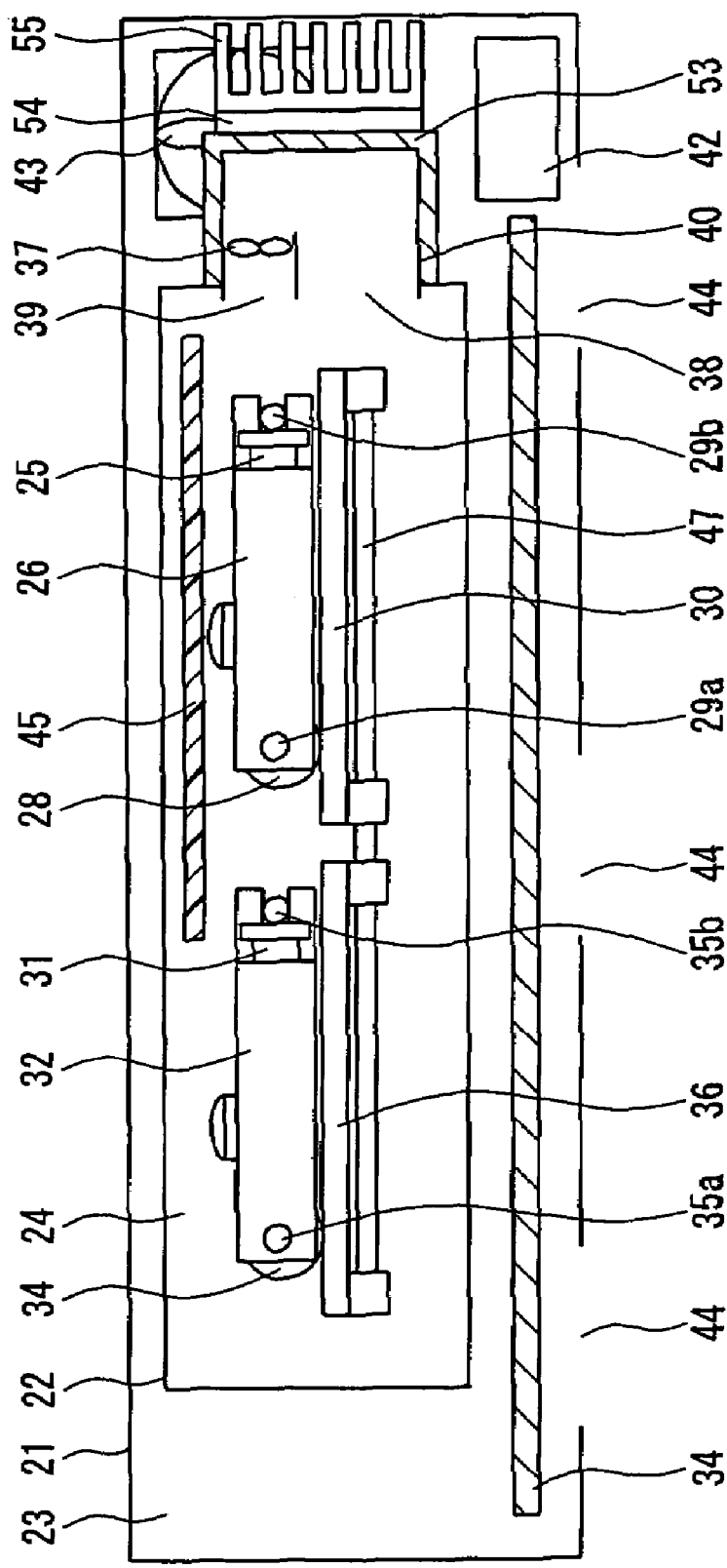
FIG. 14 is a side view schematically showing an internal structure of an optical disk device according to Embodiment 5 of the present invention.

FIG. 14 is a side view schematically showing an internal structure of an optical disk device according to Embodiment 5 of the present invention. In the figure, parts operated in the same way as those shown in FIG. 8 are denoted by the same reference numerals.

In the configuration of the present embodiment, a protruding portion in which the wind tube 40 is formed is covered with a highly thermal conductive material 53, and a heat-radiating fin 55 is adhered to the outside of the highly thermal conductive material with a Peltier element 54 sandwiched therebetween.

Due to the thermoelectric conversion effect of the Peltier element 54, the highly thermal conductive material 53 is cooled, so that air passing through the wind tube 40 can be cooled forcibly. Heat generated from the Peltier element 54 itself is transferred to the heat-radiating fin 55, and is radiated by the wind generated by the deck fan 43.

With this configuration, the air cooled forcibly is discharged from the discharge port 39 to the inside of the drive case 22, whereby the blue laser 25 or the red laser 31 can be cooled forcibly regardless of an ambient temperature condition.

Therefore, even in a recording operation using the blue laser 25 and the red laser 31 with a high power, the temperature of the laser element can be kept low, and thus the lifetime of the element can be increased.

While the present embodiment has been described by way of an example in which the Peltier element 53 is used as a cooler, the heat-radiating fin 55 may be provided alone. Further, a heat pipe or a highly thermal conductive material may be combined with the heat-radiating fin. With this configuration, heat transfer is accelerated by the heat pipe or the highly thermal conductive material, thereby increasing the cooling effect.

Further, while the present embodiment has been described by way of an example in which the first transfer mechanism and the second transfer mechanism are provided, the present embodiment also may be applied to a configuration with only one transfer mechanism.

While Embodiment 1 has been described by way of an example in which the dust collecting filter 17 is provided, the dust collecting filter may be provided in any of Embodiments 2 to 5.

While in Embodiment 2 and Embodiment 3, the descriptions have been given of the configuration in which the duct 19 is provided, and of the configuration in which the wind plate 20 is provided, respectively, theses configurations may be provided in any of Embodiments 1, 4, and 5.

While in Embodiment 4, the description has been given of the configuration in which the wind tube 40 is covered with the heat insulating material 48, this configuration may be applied to any of Embodiments 1 to 3.

While in Embodiment 1, the description has been given of the configuration in which the shield 18 is provided on the optical head 7 on a straight line between the discharge port 12*b* and the objective lens 6, this configuration may be provided in any of Embodiments 2 to 5.

INDUSTRIAL APPLICABILITY

As described above, according to the present invention, a rise in temperature of a semiconductor laser can be suppressed effectively without making a device larger, while the dust proofing is ensured, whereby a high reliability and durability with respect to heat and dust can be realized. Consequently, the present invention is available as an optical disk device for recording/reproducing information using an optical disk as an information recording medium for images, music, computer data, and the like.

The invention claimed is:

1. An optical disk device, comprising:
    an optical disk drive mechanism disposed in a housing-shape drive case, the optical disk drive mechanism including an optical head on which a semiconductor laser is mounted, a rotary driver for driving an optical disk, and a transfer mechanism for transferring the optical head,
    the drive case being disposed in a housing-shape main body case, the main body case internally being partitioned into an area enclosed by the drive case and a deck area having an air hole for outside air;
    an agitating fan for making air in the drive case flow, and
    a wind path that allows air within the drive case ahead of the agitating fan to be drawn to the rear of the agitating fan,
    wherein the air drawn to the rear of the agitating fan is discharged toward the optical head or the semiconductor laser by rotation of the agitating fan, and
    the wind path is formed so that air below the optical head is drawn, and the drawn air is discharged through the agitating fan toward the optical head or the semiconductor laser, where the optical head is disposed below the optical disk.

2. The optical disk device according to claim 1,
    wherein a drive circuit for driving the optical disk drive mechanism and a power source for the drive circuit are disposed in the deck area.

3. The optical disk device according to claim 1,
    wherein the optical head is constituted by a first optical head on which a short-wavelength semiconductor laser is mounted, and a second optical head on which a long-wavelength semiconductor laser is mounted,
    the optical disk drive mechanism includes the first and second optical heads, a first transfer mechanism for transferring the first optical head, a second transfer mechanism for transferring the second optical head, and rotary drivers provided independently for the respective first and second transfer mechanisms for driving the optical disk,
    the first and second transfer mechanisms are disposed in parallel with each other in a direction perpendicular to a transfer direction of the first and second optical heads, and in parallel with a surface of the optical disk mounted on either of the rotary drivers,
    a drive circuit for driving the optical disk drive mechanism, and a power source for the drive circuit are disposed in the deck area, and
    the agitating fan is disposed at a position opposed to the first transfer mechanism so that the air discharged from the agitating fan flows initially to the first transfer mechanism and then to the second transfer mechanism.

4. The optical disk device according to claim 3, wherein the short-wavelength semiconductor laser is disposed on a side face of the first optical head that is nearer to the agitating fan in the direction perpendicular to the transfer direction of the first optical head.

5. The optical disk device according to claim 3, wherein the long-wavelength semiconductor laser is disposed on a side face of the second optical head that is nearer to the agitating fan in the direction perpendicular to the transfer direction of the second optical head.

6. The optical disk device according to claim 3, wherein in a recording/reproducing operation with the second optical head, a position of the first transfer mechanism is varied so that the air discharged from the agitating fan can be blown toward the second optical head directly.

7. The optical disk device according to claim 1,
    wherein a suction port for drawing the air in the drive case, and a discharge port for discharging the air in the drive case are formed on a side wall of the drive case, and
    the wind path is formed by a wind tube that connects the suction port and the discharge port and extends toward an outside of the drive case, and the agitating fan is disposed in the wind tube.

8. The optical disk device according to claim 7, wherein the wind tube is covered with a heat insulating material.

9. The optical disk device according to claim 7, comprising a cooler for cooling air passing trough the wind tube.

10. The optical disk device according to claim 9, wherein the cooler is an air system.

11. The optical disk device according to claim 9, wherein the cooler is a heat pipe or a highly thermal conductive material attached to the wind tube.

12. The optical disk device according to claim 9, wherein the cooler is a Peltier element.

13. The optical disk device according to claim 1, wherein the agitating fan is disposed so that the air discharged from the agitating fan is blown toward the optical head or the semiconductor laser over a full movable range of the optical head.

14. The optical disk device according to claim 1, wherein a duct is disposed so that the air discharged from the agitating fan is blown toward the optical head or the semiconductor laser over a full movable range of the optical head.

15. The optical disk device according to claim 14, wherein the duct is a wind directing plate, a tilt angle of which is varied in conjunction with movement of the optical head in a radial direction of the optical disk, and the variation in the tilt angle allows a direction of an airflow discharged from the agitating fan to follow the movement of the optical head.

16. The optical disk device according to claim 1, wherein a dust collecting filter is provided for collecting dust in the drawn air.

17. The optical disk device according to claim 1, wherein a shield is provided on a straight line between a position from which an airflow discharged from the agitating fan is discharged to an inside of the drive case and an objective lens mounted on the optical head for focusing light of the semiconductor laser.

18. An optical disk device, comprising:
- an optical disk drive mechanism disposed in a housing-shape drive ease, the optical disk drive mechanism including an optical head on which a semiconductor laser is mounted, a rotary driver for driving an optical disk, and a transfer mechanism for transferring the optical head,
- the drive case being disposed in a housing-shape main body case, the main body case internally being partitioned into an area enclosed by the drive case and a deck area having an air hole for outside air;
- an agitating fan for making air in the drive case flow, and
- a wind path that has a suction port and a discharge port facing an inside of the drive case and is formed in the drive case,
- wherein air flowing through the suction port from the drive case is discharged through the agitating fan and the discharge port toward the optical head or the semiconductor laser by rotation of the agitating fan, and
- the suction port is formed below the discharge port where the optical head is disposed below the optical disk.

* * * * *